UNITED STATES PATENT OFFICE.

LUDWIG HEINRICH REUTER, OF NEW YORK, N. Y.

PROCESS OF MAKING TERPIN HYDRATE.

No. 840,962.     Specification of Letters Patent.     Patented Jan. 8, 1907.

Application filed February 24, 1906. Serial No. 302,739.

*To all whom it may concern:*

Be it known that I, LUDWIG HEINRICH REUTER, a subject of the King of Bavaria, and a resident of the city of New York, borough of Brooklyn, in the county of Kings and State of New York, have invented a new and Improved Method of Making Terpin Hydrate, of which the following is a full, clear, and exact description.

One of the most important turpentine derivatives is terpin hydrate. It is not only extensively used for medicinal purposes, but is also employed on a large scale as a basis of the technical manufacture of other turpentine derivatives—as, for example, terpineol and terpinolene, two substances which are used extensively for several purposes.

Hitherto it has been impossible to develop the industry of manufacturing turpentine derivatives in the United States, for the reason that only one method of making terpin hydrate was generally known and that method involved the use of alcohol, the price of which is high.

The manufacturing process which is employed in Europe is the so-called "nitric-acid-alcohol" process, which when carried out for four or five days yields terpin-hydrate crystals up to twenty per cent. of the oil of turpentine used. It is intended in this process to recover the alcohol left in the mother-liquors for free use; but from my personal experience I am of the opinion that not only is a large proportion of the alcohol lost, but also about thirty per cent. of the oil, and that the oil which is recovered is partially oxidized or otherwise chemically changed in such a way that it cannot be used over again for the same kind of an operation.

It is the purpose of my invention not only to find a substitute for the nitric-acid-alcohol process which on account of not involving the use of alcohol can be carried out on a commercial basis in the United States, but also to improve the method of manufacturing terpin hydrate in such a manner that more of the material employed can be recovered, and therefore to provide a process which can be also used to advantage in those countries in which alcohol for commercial purposes is not subject to tax.

I have discovered that in the manufacture of terpin hydrate the use of alcohol can be dispensed with, and, furthermore, that the cheapest of all acids—namely, sulfuric acid—gives the best results. I have found also that it is not necessary to employ the costly regular oil or spirits of turpentine of the market, which has to be used in the old process, but that oil or spirits of turpentine can be used as well as discolored or otherwise damaged and impure oil of turpentine found in the southern pine districts of this country. In place of the alcohol heretofore employed I use sawdust or any other similar substance which is able to absorb oil or aqueous liquids without combining chemically therewith. It will be seen, therefore, that my new process involves the use of practically the cheapest raw and waste materials—as, for example, oil of turpentine, sulfuric acid, and sawdust.

As an example of manufacture, I mix in suitable vats, say, one hundred and twenty-five gallons of spirits of turpentine, any suitable quantity—say three hundred and fifty pounds—of sawdust or any other absorbent inert substance of a similar character. As soon as the oil has been properly absorbed by the sawdust or the like I add about seventeen hundred and fifty pounds of a diluted sulfuric acid or, in fact, a proportionate quantity of any other acid except nitric acid. The whole is then mixed until a uniform mass is obtained and then macerated at ordinary temperature for three or four weeks. During this time a remarkable change takes place. A large percentage of the oil, usually from fifty to sixty per cent., is converted into terpin hydrate, and the sawdust is filled all through with crystals of the same. In about four to six weeks time a maximum of the oil is converted, and for the purpose of removing the terpin hydrate it is necessary first to separate the non-converted oil and acid as far as both can be removed by opening a faucet at the bottom of the vat. Then the balance of the acid is removed by washing the sawdust with small portions of water at a time, and finally the non-converted oil still left in the mass is removed by distillation with live steam. The remaining mass, containing now only sawdust and terpin hydrate, is subjected to the action of boiling water under pressure for the purpose of dissolving the terpin hydrate and extracting it from the sawdust. The hot concentrated solution of terpin hydrate is filtered, and rapidly crystallizes upon cooling.

I have found that the recovered spirits of turpentine, all of the sawdust, the acid which is used, and the water in which the materials are washed can be used over again for new operations, so that the final manufacturing cost-price amounts to only about one-seventh of that of the article made from alcohol, nitric acid, and the regular spirits of turpentine of the market. In fact, I have even found that sawdust after being used several times gives a purer article than when used the first time. Regular spirits of turpentine can also be used instead of the wood spirits.

It will of course be understood that the terpin hydrate produced can be used as a basis for the manufacture of other turpentine derivatives and that by the use of this new process an important industry can be developed in the United States which has heretofore been exclusively carried out in foreign countries. An important advantage of it also is that certain raw and waste products can be employed which have heretofore had to be refined and imported.

Having thus described my invention, I claim—

1. A process of making terpin hydrate, consisting in absorbing spirits of turpentine in a porous inactive solid and reacting on the mixture with a dilute acid, mixing, and allowing the mixture to stand.

2. A process of making terpin hydrate, which consists in absorbing spirits of turpentine in sawdust, and reacting upon the mixture with dilute sulfuric acid, mixing, and allowing the mixture to stand.

3. A process of making terpin hydrate, consisting in absorbing spirits of turpentine in sawdust, treating the admixture with sulfuric acid, and allowing the whole to stand.

4. A process of making terpin hydrate, consisting in mixing spirits of turpentine, a dilute acid and a porous inactive material which absorbs liquids, macerating the mixture, removing the acid and non-converted oil, and extracting terpin hydrate from the residue.

5. A process of manufacturing terpin hydrate, consisting in mixing spirits of turpentine, dilute sulfuric acid and a porous inactive material, macerating the mixture, removing the acid and non-converted oil, and extracting turpin hydrate from the residue.

In testimony whereof I have signed my name to this specification in the presence of two subscribing witnesses.

LUDWIG HEINRICH REUTER.

Witnesses:
ALBERT E. FAY,
EVERARD B. MARSHALL.